US007722411B2

(12) United States Patent
Merrow et al.

(10) Patent No.: US 7,722,411 B2
(45) Date of Patent: May 25, 2010

(54) VOICE AND DATA PATCH PANEL HAVING A BRACKET FOR STRUCTURED WIRE ENCLOSURES

(75) Inventors: Jack K. Merrow, Bothel, WA (US);
Billy F Schoonover, Bellevue, WA (US);
Roy Hauner, Franklin Square, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 12/200,389

(22) Filed: Aug. 28, 2008

(65) Prior Publication Data

US 2010/0055974 A1    Mar. 4, 2010

(51) Int. Cl.
*H01R 9/22* (2006.01)
(52) U.S. Cl. ...................................... 439/713
(58) Field of Classification Search .................. 439/713, 439/131, 709, 719; 361/823, 426, 428–429
See application file for complete search history.

(56) References Cited

U.S. PATENT DOCUMENTS

| 5,156,551 | A | * | 10/1992 | Unger et al. | 439/49 |
| 5,401,193 | A | * | 3/1995 | Lo Cicero et al. | 439/713 |
| 5,575,665 | A | * | 11/1996 | Shramawick et al. | 439/49 |
| 5,765,698 | A | * | 6/1998 | Bullivant | 211/26 |
| 5,975,962 | A | | 11/1999 | Laukonis | |
| 6,245,998 | B1 | * | 6/2001 | Curry et al. | 174/72 A |
| 7,404,736 | B2 | * | 7/2008 | Herbst et al. | 439/557 |
| 2008/0096438 | A1 | | 4/2008 | Clark et al. | |
| 2008/0159744 | A1 | * | 7/2008 | Soto et al. | 398/115 |

OTHER PUBLICATIONS

"Structured Cabling Systems", *The Industry's Premier Line of Wiring Devices*, L-101, Section L, pp. L2-L66, Leviton.

* cited by examiner

*Primary Examiner*—Jean F Duverne
(74) *Attorney, Agent, or Firm*—Carter, DeLuca, Farrell & Schmidt, LLP

(57) ABSTRACT

The present disclosure is directed to a patch panel. The patch panel has a bracket having a panel interface having a front surface and a back surface substantially parallel to each other, at least one opening in the panel interface extends from the front surface to the back surface, at least one mounting member on the front surface of the bracket, at least one mounting member on the back surface of the bracket, a first pair of opposing edges and a second pair of opposing edges, the first pair and second pair of opposing edges are formed perpendicular to the panel interface. The patch panel also has a patching module having a number of connection elements, such as jacks, on a front side of the patching module and a number of connectors, such as insulation displacement connectors, on a back side of the patching module, wherein each connector is associated with one of the connection elements on the front side of the patching module.

38 Claims, 6 Drawing Sheets

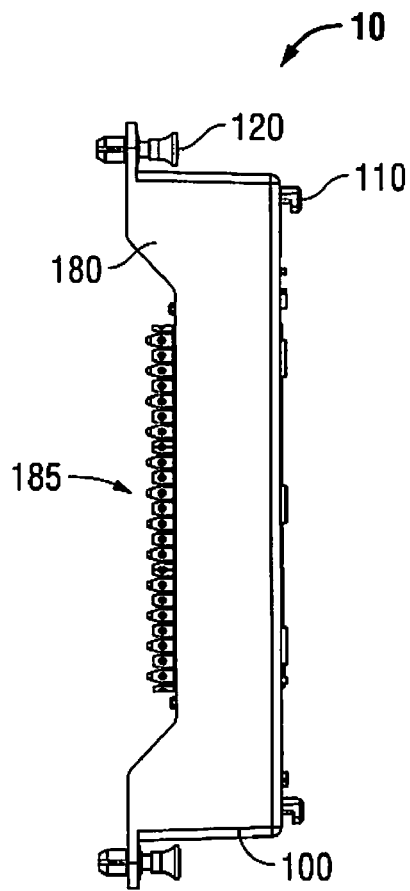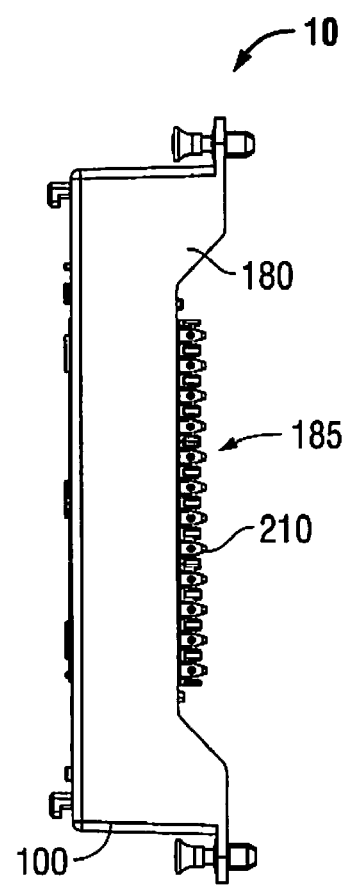
FIG. 2A  FIG. 2B

VOICE AND DATA PATCH PANEL HAVING A BRACKET FOR STRUCTURED WIRE ENCLOSURES

BACKGROUND

The present disclosure is directed to structured wire enclosures and, more specifically, it is directed to a voice and data patch panel for use in a structured wire enclosure which is a low profile, high density, aesthetically pleasing jack panel showing only jacks and labeling to the user, while hiding cabling and terminations.

Structured wiring enclosures or Structured Media® enclosures may be the central point for any structured wiring system. Within the enclosure, there are hubs for telephone, video, audio, Internet, networking or any additional electronic system that may be employed in a residential or office environment. Inside the enclosure, patch panels, also known as patch bays or jackfields, typically house cable connections for telephone, video and networking connections. On these patch panels, a shorter patch cable plugs into a front jack while a more permanent cable is connected in the back. Patch panels allow a user to quickly change the path of signals without expensive switching equipment.

Current patch panels that mount in enclosures or in other situations where normal access to the rear of the panel is difficult or restricted have many disadvantages. Such patch panels often have the jacks on the same side as insulation displacement punch down terminals thereby presenting a convoluted mess of wires to a user. In situations where the jacks are placed on the front of a patch module and the insulation displacement punch down terminals are on the rear of the patch module, the insulation displacement punch down terminals are not easily accessible and are difficult to work with because they are not securely located within the Structured Media® enclosure.

SUMMARY

In an embodiment of the present disclosure, a bracket is provided. The bracket can be molded or manufactured using any other known manufacturing method. The bracket has a panel interface having a front surface and a back surface substantially parallel to each other, at least one opening in the panel interface extends from the front surface to the back surface, at least one mounting member on the front surface of the bracket, and at least one mounting member on the back surface of the bracket.

In another embodiment of the present disclosure, the bracket has label holders on the front surface.

In yet another embodiment of the present disclosure, the bracket has a pair of opposing edges, the pair of opposing edges forming an angle with the panel interface.

In yet another embodiment of the present disclosure, the pair of opposing edges has at least one recessed portion in the center of each of the pair of opposing edges.

In yet another embodiment of the present disclosure, the pair of opposing edges has a number of slots, each slot having a necked down opening.

In yet another embodiment of the present disclosure, the bracket has at least one number embossed or otherwise shown on the front surface of the panel interface and at least one number embossed or otherwise shown on the back surface of the panel interface. It is contemplated that the at least one number can instead be alphanumeric characters, letters, symbols or other indicia.

In yet another embodiment of the present disclosure, the bracket has a support bar.

In yet another embodiment of the present disclosure, the bracket has at least one patching module. Each of the at least one patching module has at least one connection element, such as a jack, on a front side of the at least one patching module, and at least one connector, such as insulation displacement connector, on a back side of the at least one patching module, wherein one of the at least one connector is associated with one of the at least one connection element on the front side of the at least one patching module.

In yet another embodiment of the present disclosure, each of the at least one patching module is held in place in the bracket by the at least one mounting member such that the at least one connection element on one of the at least one patching module fits into one of the at least one opening in the panel interface.

In yet another embodiment of the present disclosure, the bracket has a cover operable to cover the at least one opening. The cover is operable to cover at least part of the at least one opening.

In yet another embodiment of the present disclosure, the bracket has a hinge along one side of the panel interface.

In yet another embodiment of the present disclosure, a patch panel is provided. The patch panel has a bracket, the bracket having a panel interface having a front surface and a back surface substantially parallel to each other, at least one opening in the panel interface extends from the front surface to the back surface, at least one mounting member on the front surface of the bracket, at least one mounting member on the back surface of the bracket, a first pair of opposing edges and a second pair of opposing edges, the first pair and second pair of opposing edges are formed perpendicular to the panel interface. The patch panel also has a patching module having at least one connection element on a front side of the patching module and at least one connector on a back side of the patching module, wherein one of the at least one connector is associated with one of the at least one connection element on the front side of the patching module.

In yet another embodiment of the present disclosure, the first pair of opposing edges has at least one recessed portion in the center of each of the first pair of opposing edges.

In yet another embodiment of the present disclosure, the second pair of opposing edges has a number of slots, each slot having a necked down opening.

In yet another embodiment of the present disclosure, the patch panel has a cover operable to cover the at least one opening. The cover is operable to cover at least part of the at least one opening.

In yet another embodiment of the present disclosure, the patching module is held in place in the bracket by the at least one mounting member such that the at least one connection element on the patching module fits into one of the at least one opening in the panel interface.

In yet another embodiment of the present disclosure, a method of using a patch panel is provided. The method provides attaching the patch panel to a Structured Media® enclosure with a back side facing outward, attaching a patching module to the patch panel using at least one mounting member on the back surface of the patch panel, attaching at least one cable to a connector on the patching module, rotating the patch panel one hundred eighty degrees, and attaching the patch panel to the Structured Media® enclosure.

In yet another embodiment of the present disclosure, the method further provides placing the attached cable into a necked down opening located at an edge of the patch panel.

In yet another embodiment of the present disclosure, the method further provides rotating the patch panel around a central axis that extends in a vertical direction.

BRIEF DESCRIPTION OF THE DRAWINGS

FIG. 2A illustrates a right side view of a patch panel in accordance with the present disclosure.

FIG. 2B illustrates a left side view of a patch panel in accordance with the present disclosure.

DETAILED DESCRIPTION

Embodiments will be described below while referencing to the accompanying figures. The accompanying figures are merely examples and are not intended to limit the scope of the present disclosure.

The present disclosure is directed to a plastic bracket and patch panel that presents to end users an aesthetically pleasing front surface exposing only patching connection elements, such as jacks, which protrude through molded openings and labels in embedded label holders, while on the reverse side presenting 110-style insulation displacement connector (IDC) punch-down terminations for Category 5e and/or Category 6 unshielded twisted pair cabling. It is contemplated that the patch panel can be configured for other type of cabling besides Category 5e and Category 6.

Figure 1:
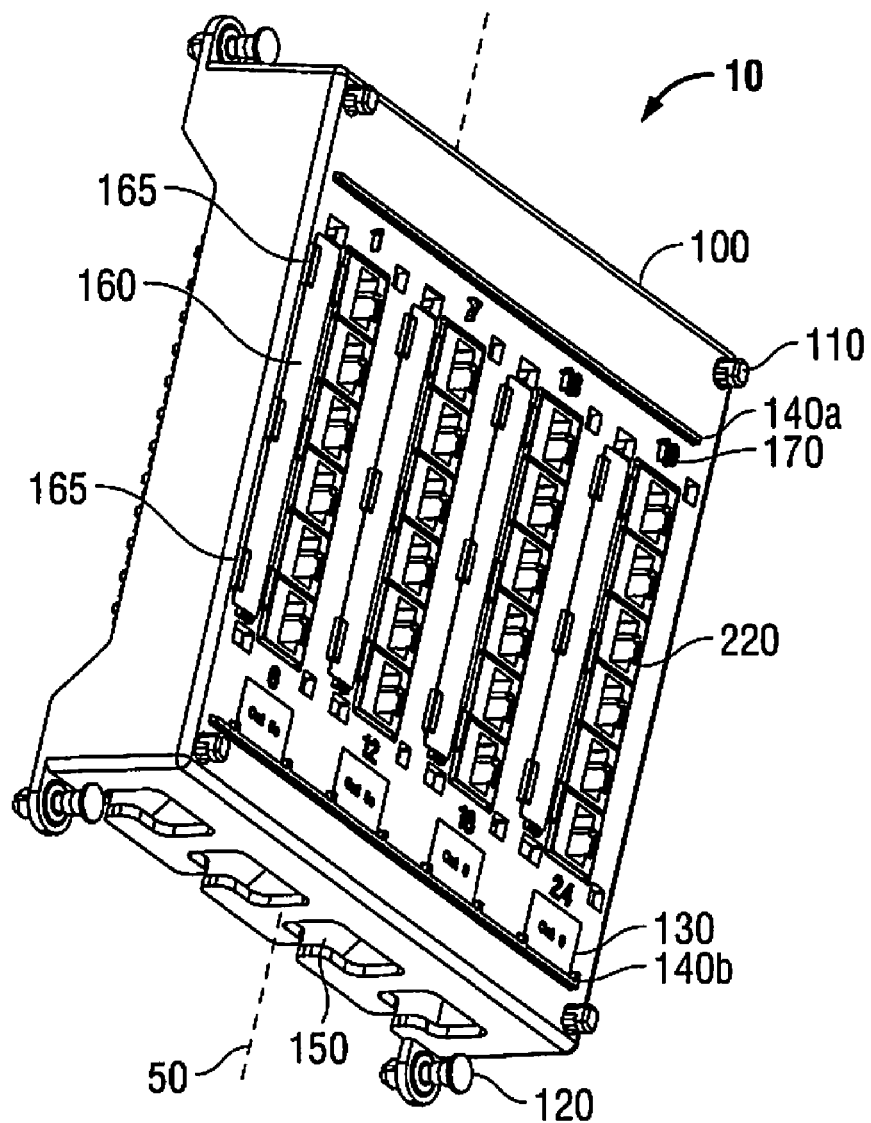
FIG. 1 illustrates a patch panel in accordance with the present disclosure.

FIG. 1 illustrates a patch panel 10 in accordance with an embodiment of the present disclosure. The patch panel 10 comprises a bracket 100 made of plastic. Although the present disclosure will describe the bracket 100 as being made of plastic, such bracket 100 can be made from any suitable material. The bracket can be molded or manufactured using any other known manufacturing method.

On the front face of bracket 100 are mounting members 110. Mounting members 110 are used to temporarily suspend the patch panel 10 in a Structured Media® enclosure which will be described below. After the patch panel is assembled, reusable push pin plastic rivets (or other types of fasteners) 120 are used to securely fasten the assembled patch panel 10 to the Structured Media® enclosure.

Labels 130 are used to identify the type of component associated with connection elements 220. For instance, connection elements 220 may be jacks connected to Category 5e or Category 6 cables. If the particular column of connection elements 220 is Category 5e, then label 130 identifies the connection elements 220 as Category 5e. If the particular column of connection elements 220 is Category 6, then label 130 identifies the connection elements 220 as Category 6. The bracket 100 also has support bars 140a and 140b. The support bars are used during assembly of the patch panel 10 as support while patch modules, which will be described below, are added to the bracket 100. In addition, as shown in FIG. 1, support bar 140b has place holders for labels 130.

The bottom edge of bracket 100 has a necked down opening 150. As shown in FIG. 1, necked down opening has a small narrow opening facing the rear of the bracket 100 with a larger opening near the front of the bracket 100. The purpose of necked down opening 150 will be described below with reference to FIG. 5. Although FIG. 1 shows necked down opening on the bottom of the bracket 100, necked down opening 150 may also, or alternatively, be on the top edge of bracket 100.

In order to identify the connection elements 220, the bracket 100 has molded-in label holders 165 that enable a user (installer) to insert paper labels 160. Paper labels 160 may be covered by clear protective plastic covers. Alternatively, labels 160 may be stickers printed by a label printer. Still alternatively, the connection elements can be labeled by any known method of labeling which is deemed suitable by the user (installer). The labels 160 identify each connection element position with the wallplate termination location on the other end of the terminated Category 5e and/or Category 6 cable. These molded-in label holders eliminate the cost of further assembly for separate label holders, reduce the packaging requirements for separate replacement label holders, reduce the likelihood of lost label holder parts, and provide a much more aesthetic front surface presentation to the end user. In addition, connection elements 220 may be identified by at least one number 170 that is embossed on the bracket 100. The at least one number 170 corresponds to at least one number embossed on the rear of the bracket which will be described below. It is contemplated that the at least one number 170 can instead be alphanumeric characters, letters, symbols or other indicia.

FIGS. 2A and 2B are right and left side views, respectively, of the patch panel 10. As shown in FIGS. 2A and 2B, side wall or edge 180 of bracket 100 has a recessed portion 185 in the center of side wall or edge 180. The recessed portion 185 allows a user (installer) to access the insulation displacement connector (IDC) punch-down terminations 210 of the patch module.

Figure 3:
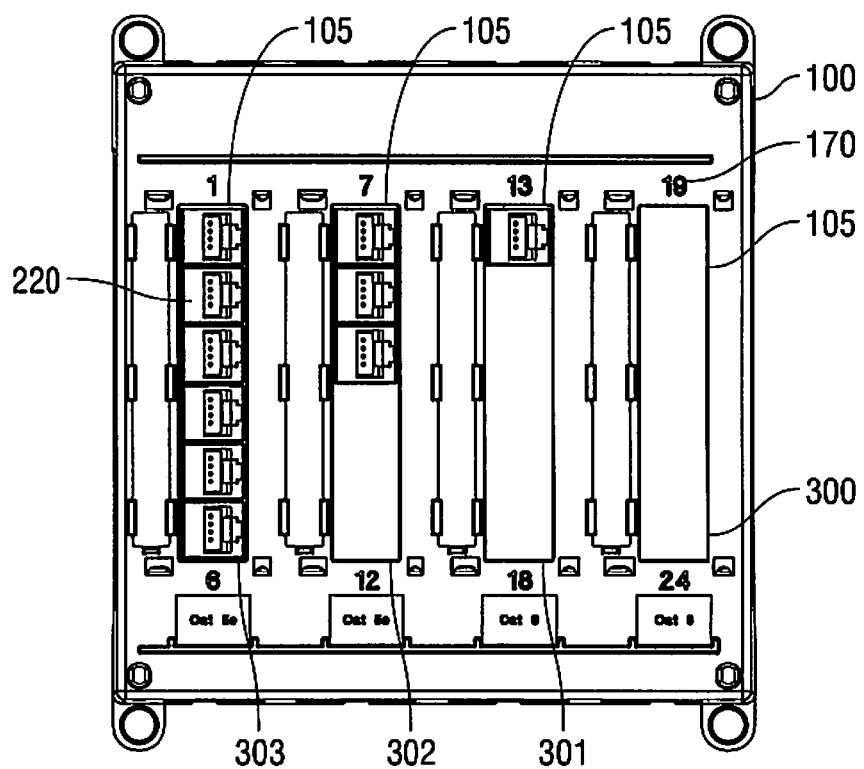
FIG. 3 illustrates a front view of a patch panel in accordance with the present disclosure.

FIG. 3 is a front view of patch panel 10. As shown in FIG. 3, the bracket 100 has a number of openings 105. Opening 105 allows access to connection elements 220. Openings 105 may have a cover 300 placed over unused connection elements 220 or spaces where there are no connection elements. Cover 300 may be made of plastic or any other suitable material. Cover 300 can also be modified so that all the connection elements may be covered as shown by element 300 or a partial number of connection elements may be covered. For example, cover 301 covers connection elements 14 through 18, cover 302 covers connection elements 10-12 and cover 303 covers connection element 6 as identified by embossed numbers 170.

Figure 4:
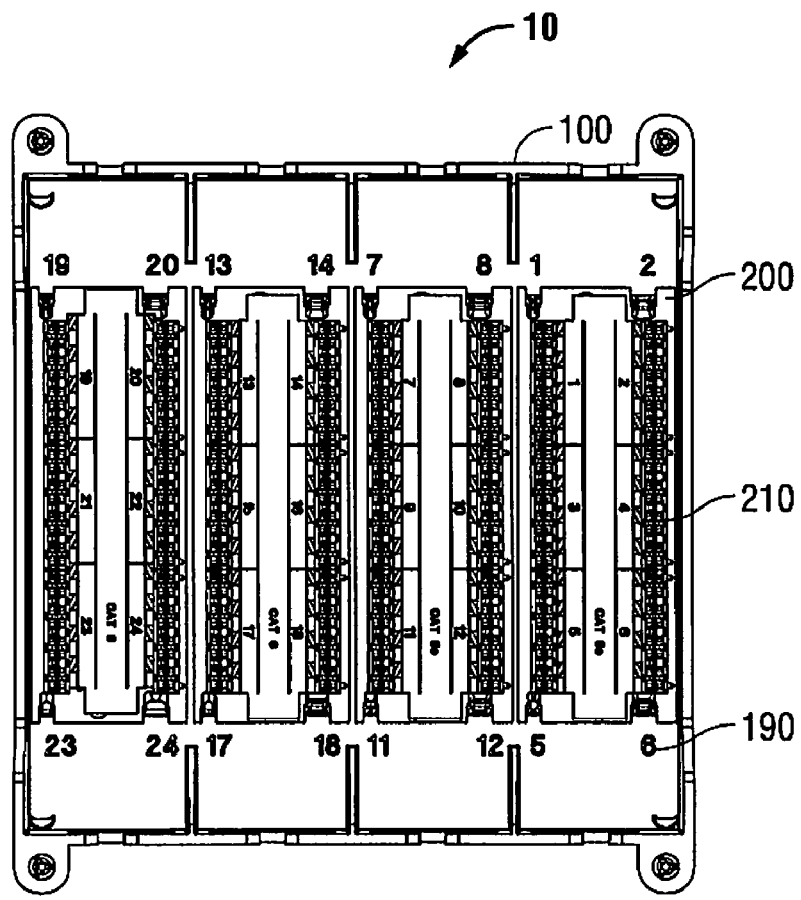
FIG. 4 illustrates a rear view of a patch panel in accordance with the present disclosure.

FIG. 4 is a rear view of the patch panel 10. As shown in FIG. 4, numbers 190 are embossed on the rear face of bracket 100. Numbers 190 correspond to numbers 170 embossed on the front surface of the bracket 100. The embossed numbers 170 and 190 allow a user (installer) to easily identify which connection element corresponds to which set of IDC punch down terminations 210 on patch module 200.

Figure 5:
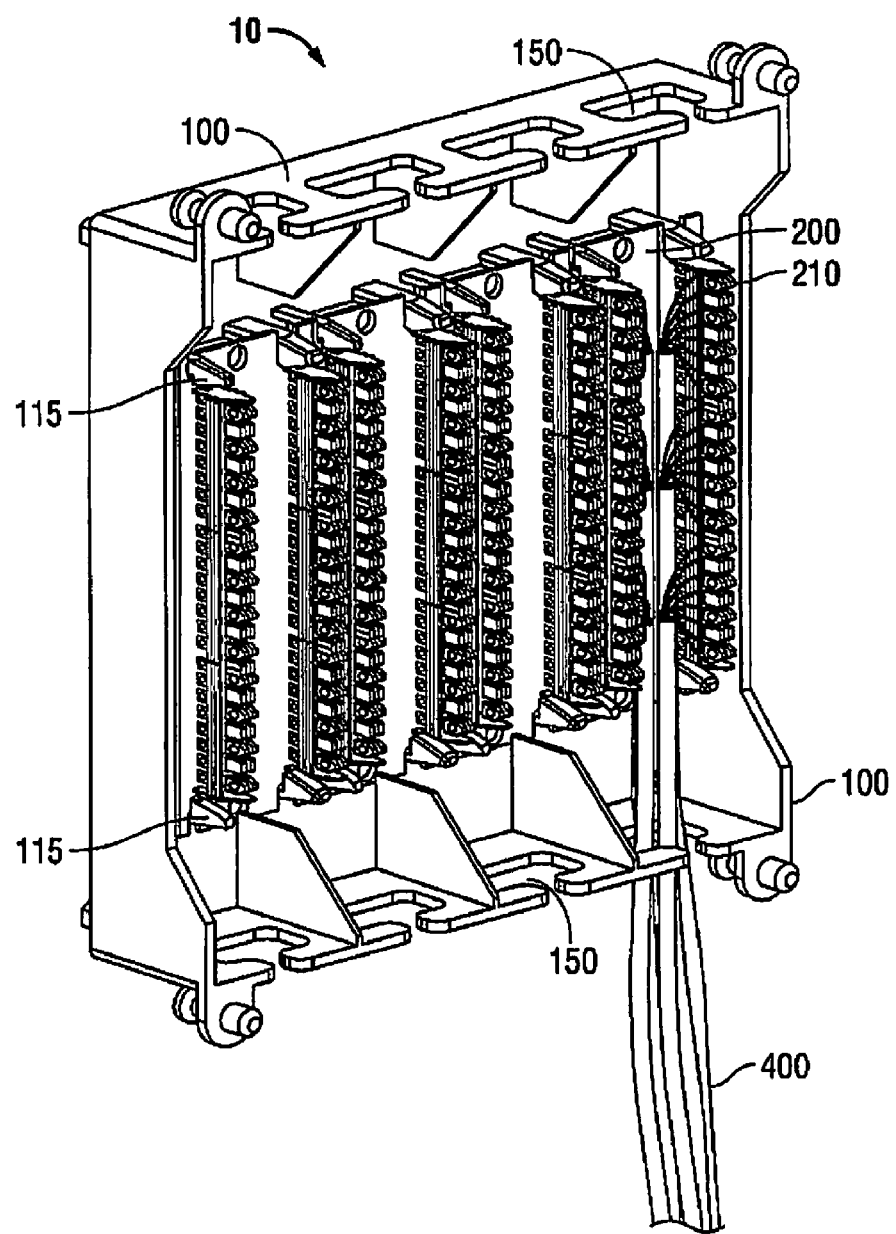
FIG. 5 illustrates a rear view of a patch panel in accordance with the present disclosure.

FIG. 5 is a rear view of the patch panel 10. As shown in FIG. 5, patch modules 200 are snapped or latched into place by mounting members 115. Mounting members 115 are preferably flexible to prevent mounting members 115 from fracturing or breaking due to flexure forces. Although FIG. 5 shows four patch modules, the patch panel 10 can be designed to accommodate any number of patch modules. Patch modules 200 preferably have IDC punch-down terminations 210 to accommodate Category 5e or Category 6 cables. FIG. 5 depicts cables 400 which can be Category 5e or Category 6 cables. The end of cables 400 are punched down into IDC punch-down terminations 210. Once the cables are attached to punch-down terminations 210, the jacketed portion of each cable is pushed into the necked down opening 150. The necked down opening 150 then hold these cables in place when the patch panel 10 is twisted or turned in place. As shown in FIG. 5, necked down openings 150 are located at the top and bottom of the bracket 100.

As previously mentioned, patch panel 10 is capable of being used in a Structured Media® enclosure. Patch panel 10 is oriented so that the front face of the bracket 100 is facing the Structured Media® enclosure. Using mounting members 110, the bracket 100 is temporarily suspended in the Structured Media® enclosure. Then patch modules 200 are placed and secured in the bracket 100 using mounting members 115 so that connection elements 220 are placed in openings 105 and can be accessed from the front of the bracket 100. The ends of cables 400 are attached to the IDC punch-down terminations 210 and then the jacketed portion of the cables 400 are pushed into the necked down opening 150. The assembled patch panel is then rotated 180 degrees in a horizontal direction along a vertical central axis 50 as shown in FIG. 1. Once the assembled patch panel is rotated, it is secured to the Structured Media® enclosure using fasteners, such as, the reusable push pin plastic rivets 120.

Figure 6:
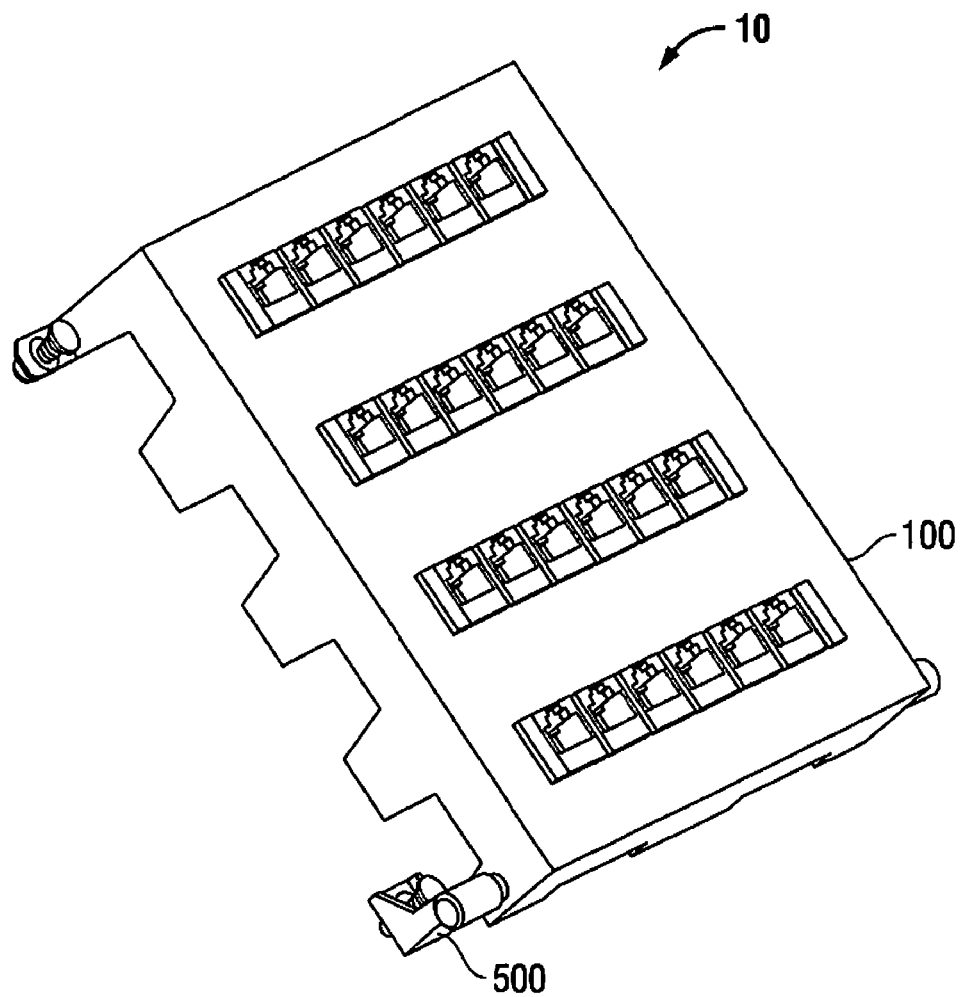
FIG. 6 illustrates a patch panel in accordance with the present disclosure.

FIG. 6 is another example of the patch panel 10. As shown in FIG. 6, one end of bracket 100 is fitted with hinge 500. Hinge 500 allows a user (installer) to rotate the bracket 100 along the hinge 500 to gain access to the rear side of the bracket.

The patch panel has many advantages over conventional techniques used as enclosure-based or other patching points for voice and data cabling where normal access to the rear of the panel is difficult or restricted. The patch panel according to the present disclosure provides a more aesthetically pleasing patch panel that only shows connection elements and associated labeling to a user (installer) while hiding twisted pair cabling and IDC punch down terminations. The patch panel also allows a user (installer) to easily access the rear of the patch panel by placing mounting members on the front surface that allow a user (installer) to temporarily suspend the patch panel in the Structured Media® enclosure. In addition, the mounting height of the patch panel in the Structured Media® enclosure allows an adequate bend radius of the patch cord between the panel connection elements and the cover of the Structured Media® enclosure.

It will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The invention claimed is:

1. A bracket comprising:
a panel interface having a front surface and a back surface;
at least one opening in said panel interface extending from said front surface to said back surface;
at least one mounting member on said front surface of said bracket, said at least one mounting member configured to fixedly mount said bracket to a surface, said front face of said bracket facing a structured media enclosure, said bracket configured to be temporarily suspended in said structured media enclosure for enabling assembly; and
at least one mounting member on said back surface of said bracket.

2. The bracket of claim 1, further comprising label holders on said front surface.

3. The bracket of claim 1, further comprising a pair of opposing edges, said pair of opposing edges forming an angle with said panel interface.

4. The bracket of claim 3, wherein said pair of opposing edges have at least one recessed portion in the center of each of said pair of opposing edges.

5. The bracket of claim 1, further comprising indicia on said front surface of said panel interface and indicia on said back surface of said panel interface.

6. The bracket of claim 1, further comprising at least one support bar.

7. The bracket of claim 1, further comprising at least one patching module, each of said at least one patching module comprising:
at least one connection element on a front side of said at least one patching module; and
at least one connector on a back side of said at least one patching module, wherein one of the at least one connector is associated with one of the at least one connection element on said front side of said at least one patching module.

8. The bracket of claim 7, wherein each one of said at least one said patching module is held in place in said bracket by at least one mounting member such that said at least one connection element on one of said at least one patching module fits into one of said at least one opening in said panel interface.

9. The bracket of claim 1, further comprising a cover operable to cover at least part of said at least one opening.

10. The bracket of claim 1, wherein said bracket has a pair of opposing edges having a number of slots each having a necked down opening.

11. The bracket of claim 10, wherein said necked down opening is used to hold cable in place during punch-down operation and while rotating bracket to its final user position.

12. The bracket of claim 1, further comprising at least one mounting member on said front surface that is a mounting hook.

13. The bracket of claim 1, further comprising at least one mounting member on said back surface that is a removable push-pull fastener.

14. The bracket of claim 1, further comprising at least one mounting member on said back surface that is a push pin rivet.

15. The bracket of claim 8, wherein said at least one mounting member of said patching module secures said patching module to said bracket.

16. The bracket of claim 1, wherein said at least one mounting member is keyed.

17. The bracket of claim 6, wherein said support bar is molded into the front surface of the bracket to help stabilize the bracket when the punch down forces are applied.

18. The bracket of claim 1, wherein said bracket and said panel interface together comprise the same footprint.

19. A patch panel comprising:
a bracket, said bracket having a panel interface having a front surface and a back surface, at least one opening in said panel interface extending from said front surface to said back surface, at least one mounting member on said front surface of said bracket, at least one mounting member on said back surface of said bracket, a first pair of opposing edges and a second pair of opposing edges, said first pair and second pair of opposing edges are formed perpendicular to said panel interface, said at least one mounting member configured to fixedly mount said bracket to a surface, said front face of said bracket facing a structured media enclosure, said bracket configured to be temporarily suspended in said structured media enclosure for enabling assembly; and a patching module having at least one connection element on a front side of said patching module and at least one connector on a back side of said patching module, wherein one of the at least one connector is associated with one of the at least one connection element on said front side of said patching module.

20. The patch panel of claim 19, wherein said first pair of opposing edges have at least one recessed portion in the center of each of said first pair of opposing edges.

21. The patch panel of claim 19, further comprising a cover operable to cover one of said at least one opening, said cover is operable to cover the entire opening or a portion of the least one opening.

22. The patch panel of claim 19, wherein said patching module is held in place in said bracket by said at least one mounting member such that said at least one connection element on said patching module fits into one of said at least one opening in said panel interface.

23. The patch panel of claim 19, wherein said bracket has a pair of opposing edges having a number of slots each having a necked down opening.

24. The patch panel of claim 23, wherein said necked down opening is used to hold cable in place during punch-down operation and while rotating bracket to its final user position.

25. The patch panel of claim 19, further comprising at least one mounting member on said front surface that is a mounting hook.

26. The patch panel of claim 19, further comprising at least one mounting member on said back surface that is a removable push-pull fastener.

27. The patch panel of claim 19, further comprising at least one mounting member on said back surface that is a push pin rivet.

28. The patch panel of claim 22, wherein said at least one mounting member of said patching module secures said patching module to said bracket.

29. The patch panel of claim 19, wherein said at least one mounting member is keyed.

30. The patch panel of claim 19, further comprising indicia on said front surface of said panel interface and indicia on said back surface of said panel interface.

31. A method of using a patch panel in operable communication with a bracket, the patch panel comprising:
    attaching the patch panel to a structured wiring enclosure with a back side facing outward;
    attaching a patching module to the patch panel using at least one mounting member on the back surface of said patch panel, a front face of said bracket facing a structured media enclosure, said bracket temporarily suspended in said structured media enclosure;
    attaching at least one cable to a connector on said patching module;
    detaching the patch panel from the structured wiring enclosure;
    rotating the patch panel one hundred eighty degrees; and
    attaching the patch panel to the structured wiring enclosure.

32. The method of claim 31, wherein said attaching at least one cable further includes placing the attached cable into a necked down opening located at an edge of the patch panel.

33. The method of claim 31, wherein said rotating the patch panel includes rotating the patch panel around a central axis that extends in a vertical direction.

34. The method of claim 31, wherein the at least one cable is a Category 5e or Category 6 cable.

35. The method of claim 31, wherein said bracket has a pair of opposing edges having a number of slots each having a necked down opening.

36. The method of claim 31, wherein said bracket comprises at least one support bar.

37. The method of claim 31, wherein said bracket includes at least one recessed portion configured for accommodating a tool therethrough for accessing connectors of said patching module.

38. The method of claim 31, wherein said patching module comprises at least one mounting member which is keyed with respect to at least one other mounting member.

* * * * *